United States Patent
Ikemoto

(10) Patent No.: US 9,624,862 B2
(45) Date of Patent: Apr. 18, 2017

(54) CONTROL APPARATUS FOR INTERNAL COMBUSTION ENGINE

(75) Inventor: Masato Ikemoto, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 262 days.

(21) Appl. No.: 14/373,114

(22) PCT Filed: Jan. 26, 2012

(86) PCT No.: PCT/JP2012/051684
§ 371 (c)(1),
(2), (4) Date: Jul. 18, 2014

(87) PCT Pub. No.: WO2013/111306
PCT Pub. Date: Aug. 1, 2013

(65) Prior Publication Data
US 2015/0204262 A1 Jul. 23, 2015

(51) Int. Cl.
*F02D 41/24* (2006.01)
*F02D 41/40* (2006.01)
(Continued)

(52) U.S. Cl.
CPC ....... *F02D 41/2441* (2013.01); *F02D 35/023* (2013.01); *F02D 41/247* (2013.01);
(Continued)

(58) Field of Classification Search
CPC ............. F02D 41/2441; F02D 41/2467; F02D 41/247; F02D 41/3836; F02D 41/402;
(Continued)

(56) References Cited

U.S. PATENT DOCUMENTS 4,991,102 A * 2/1991 Sakamoto ........... F02D 41/2467
123/480
6,694,945 B2 * 2/2004 Kawaguchi ......... F02D 41/0085
123/299
(Continued)

FOREIGN PATENT DOCUMENTS

JP 2002-317735 A 10/2002
JP 2003-148300 A 5/2003
(Continued)

OTHER PUBLICATIONS

International Search Report for PCT/JP 2012/051684 dated Feb. 21, 2012.

*Primary Examiner* — Hai Huynh
*Assistant Examiner* — George Jin
(74) *Attorney, Agent, or Firm* — Sughrue Mion, PLLC

(57) ABSTRACT

A control apparatus for an internal combustion engine in the present invention is provided with a fuel injection valve (12) which is capable of directly injecting fuel into a cylinder, and which includes: a needle valve (12b) that has a seat contact part (12b1) at its distal end part; and a nozzle body (12a) that has a seat part (12a1) with which the seat contact part (12b1) comes into contact, a fuel receiving part (12d) formed downstream of the seat part (12a1), and a plurality of nozzle holes (12e) formed downstream of the seat part (12a1). The control apparatus executes learning control of fuel injection amount to learn the fuel injection amount. Further, the control apparatus executes pre-learning injection of fuel prior to execution of learning-use injection of fuel for the learning control.

12 Claims, 7 Drawing Sheets

(51) Int. Cl.
*F02M 61/18* (2006.01)
*F02M 61/10* (2006.01)
*F02D 35/02* (2006.01)
*F02M 45/04* (2006.01)
*F02M 55/02* (2006.01)

(52) U.S. Cl.
CPC ....... *F02D 41/2467* (2013.01); *F02D 41/402* (2013.01); *F02M 61/10* (2013.01); *F02M 61/1806* (2013.01); *F02D 2200/101* (2013.01); *F02M 45/04* (2013.01); *F02M 55/025* (2013.01); *Y02T 10/44* (2013.01)

(58) Field of Classification Search
CPC .. F02D 35/023; F02M 61/10; F02M 61/1806; F02M 45/04; F02M 55/025; F02M 53/025; Y02T 10/44
USPC ................ 701/104, 111, 110, 103, 106, 105; 123/456, 467, 299, 300, 435; 73/114.16
See application file for complete search history.

(56) References Cited

U.S. PATENT DOCUMENTS

| | | | | |
|---|---|---|---|---|
| 6,755,176 B2 * | 6/2004 | Takeuchi | ............ | F02D 41/0085 123/299 |
| 7,219,655 B2 * | 5/2007 | Shinogle | ............ | F02M 45/04 123/456 |
| 7,588,515 B2 * | 9/2009 | Miyazaki | ............ | F02D 41/0225 477/111 |
| 7,647,160 B2 * | 1/2010 | Sugiyama | ............ | F02D 41/123 123/434 |
| 7,647,161 B2 * | 1/2010 | Haraguchi | ............ | F02D 35/028 123/299 |
| 7,657,361 B2 * | 2/2010 | Inoue | ............ | F02D 41/1498 123/436 |
| 7,899,603 B2 * | 3/2011 | Yamamoto | ............ | F02D 41/2438 123/299 |
| 2005/0092300 A1 * | 5/2005 | Asano | ............ | F02D 41/0097 123/436 |
| 2009/0055082 A1 * | 2/2009 | Ikeda | ............ | F02D 41/3845 701/104 |
| 2009/0118979 A1 | 5/2009 | Sato | | |
| 2009/0132152 A1 * | 5/2009 | Haraguchi | ............ | F02D 35/028 701/106 |
| 2010/0305836 A1 * | 12/2010 | Okada | ............ | F02D 41/2438 701/106 |
| 2012/0234294 A1 * | 9/2012 | Nakamura | ............ | F02D 9/06 123/436 |

FOREIGN PATENT DOCUMENTS

| | | |
|---|---|---|
| JP | 2007-064191 A | 3/2007 |
| JP | 2008-298002 A | 12/2008 |
| JP | 2009-114946 A | 5/2009 |
| JP | 2009-115068 A | 5/2009 |
| JP | 2011-226417 A | 11/2011 |

* cited by examiner

CONTROL APPARATUS FOR INTERNAL COMBUSTION ENGINE

CROSS REFERENCE TO RELATED APPLICATIONS

This application is a National Stage of International Application No. PCT/JP2012/051684 filed Jan. 26, 2012, the contents of all of which are incorporated herein by reference in their entirety.

TECHNICAL FIELD

The present invention relates to a control apparatus for an internal combustion engine, and particularly to a control apparatus for an internal combustion engine which includes a fuel injection valve that is capable of directly injecting fuel into a cylinder.

BACKGROUND ART

So far, for example, Patent Document 1 discloses a control apparatus for an internal combustion engine that executes learning control for small fuel injection amount. More specifically, this learning control of the small fuel injection amount executes a fuel injection with small amount when a fuel cut operation is performed at the time of deceleration, and is executed based on the relation between the fuel injection amount at this time and a generated torque of the internal combustion engine.

Meanwhile, the following configuration is known as that of a fuel injection valve used for an internal combustion engine. More specifically, a fuel injection valve is known which includes a needle valve that has a seat contact part at its distal end part, and a nozzle body that has a seat part with which the seat contact part comes into contact, and further includes a fuel receiving part (to which, so-called, a sac or the like corresponds) formed downstream of the seat part, and at least one nozzle hole formed downstream of the seat part.

According to the fuel injection valve having the configuration described above, injection characteristics such as injection amount characteristics change whether the valve is in a state in which the fuel amount charged in the fuel receiving part is large (liquid-tight state) or a state in which the amount of fuel charged in the fuel receiving part is small (gas-tight state). Therefore, if the learning control of the small fuel injection amount described in Patent Document 1 is executed in the internal combustion engine including a fuel injection valve having the aforementioned configuration, the fuel injection amount actually injected from the needle holes fluctuates depending on whether the internal state of the fuel receiving part is in the liquid-tight state or the gas-tight state. As a result of this, there is a concern that the accuracy of the learning of fuel injection amount may decrease. In addition, such concern becomes more pronounced when a learning control of small fuel injection amount such as the above described learning control is performed.

Including the above described document, the applicant is aware of the following documents as related art of the present invention.

CITATION LIST

Patent Documents

Patent Document 1: Japanese Laid-open Patent Application Publication No. 2009-115068

Patent Document 2: Japanese Laid-open Patent Application Publication No. 2011-226417

Patent Document 3: Japanese Laid-open Patent Application Publication No. 2009-114946

SUMMARY OF INVENTION

The present invention has been made to solve the problem as described above, and has its object to provide a control apparatus for an internal combustion engine which can favorably improve the accuracy of learning control of a fuel injection amount that is executed during operation, in an internal combustion engine equipped with a fuel injection valve having a nozzle body that includes a fuel receiving part provided downstream of a seat part with which a seat contact part of a needle valve comes into contact, and at least one nozzle hole.

The present invention is a control apparatus for an internal combustion engine equipped with a fuel injection valve which is capable of directly injecting fuel into a cylinder, and which includes: a needle valve that has a seat contact part at its distal end part; and a nozzle body that has a seat part with which the seat contact part comes into contact, a fuel receiving part formed downstream of the seat part, and at least one nozzle hole formed downstream of the seat part, the present invention includes learning execution means and pre-learning injection execution means.

The learning execution means executes learning control of fuel injection amount to learn the fuel injection amount. Further, the pre-learning injection execution means executes pre-learning injection of fuel prior to execution of learning-use injection for the learning control.

According to the present invention, prior to the execution of the learning-use injection, the pre-learning injection is executed. As a result, the learning-use injection can be executed after the inside of the fuel receiving part is put in a liquid-tight state. This can stabilize the injection amount of fuel that is actually injected from the nozzle holes, and can therefore suppress a variation in the learning values of the fuel injection amount for the learning control of the fuel injection amount. Because of this, the learning accuracy of the fuel injection amount can be improved.

Moreover, the pre-learning injection in the present invention may be filling-use injection to fill the fuel receiving part by fuel.

This makes it possible to execute the learning-use injection after the inside of the fuel receiving part is surely put in the liquid-tight state. The learning accuracy of the fuel injection amount can be therefore improved.

Moreover, the learning control in the present invention may be a learning control of small injection to inject, as the learning-use injection, smaller amount of fuel than an amount of fuel that is required to an idling operation of the internal combustion engine during deceleration of the internal combustion engine, the small injection being executed based on a relation between an amount of the learning-use injection and a fluctuation of rotational speed of the internal combustion engine when the learning-use injection is executed.

This makes it possible to improve the learning accuracy in a case of executing a learning control of small fuel injection amount which is affected more pronouncedly by a change in the internal state of the fuel receiving part.

Moreover, the learning execution means in the present invention may include: first learning parameter calculation means for calculating a first learning parameter as to an amount of fuel that is injected by the learning-use injection when the learning-use injection is executed without being accompanied by the pre-learning injection; second learning parameter calculation means for calculating a second learning parameter as to an amount of fuel that is injected by the learning-use injection when the learning-use injection is executed with the pre-learning injection; and injection mode switching means for causing the learning-use injection to be executed without being accompanied by the pre-learning injection when a difference between the second learning parameter and the first learning parameter is smaller than a predetermined value, the injection mode switching means being for causing the learning-use injection to be executed with the pre-learning injection when the difference is equal to or higher than the predetermined value.

This makes it possible to determine the internal state of the fuel receiving part on the basis of the magnitude of the aforementioned difference, and allow the learning control with the pre-learning injection to be executed only in a situation that can be judged that there is a possibility of occurrence of a variation in the learning values (occurrence of an erroneous learning). Therefore, an unnecessary pre-learning injection can be prevented from being executed in a situation in which the internal state of the fuel receiving part is stable in the liquid-tight state.

Moreover, the present invention may further include multi injection execution means for executing, using the fuel injection valve, two small injections that are executed with a command value of a same fuel injection amount at a timing in which injected fuel is capable of being ignited, in addition to main injection for generating a torque of the internal combustion engine. When a post injection as the small injection is not executed at a last cycle, the pre-learning injection execution means may use, as the pre-learning injection, a first small injection of the two small injections. The learning execution means may use, as the first learning parameter, a learning parameter as to an injection amount of fuel injected by the first small injection, and use, as the second learning parameter, a learning parameter as to an injection amount of fuel injected by a second small injection.

This makes it possible to determine the internal state of the fuel receiving part using a predetermined small injection included in the multi injection.

Moreover, the present invention may further include multi injection execution means for executing, using the fuel injection valve, one or a plurality of small injections during one cycle in addition to main injection for generating a torque of the internal combustion engine. The learning execution means may include: first learning execution means for, when the learning-use injection is executed without being accompanied by the pre-learning injection, calculating a first learning value for bringing an estimated value of injection amount of fuel injected by the learning-use injection in line with a command value of fuel injection amount for the learning-use injection; second learning execution means for, when the learning-use injection is executed with the pre-learning injection, calculating a second learning value for bringing an estimated value of injection amount of fuel injected by the learning-use injection in line with a command value of fuel injection amount for the learning-use injection; and learning value selection means for selecting a learning value so that the first learning value is used with respect to the small injection that is executed first after elapse of a predetermined period in an expansion stroke at which a decrease rate of in-cylinder pressure is high, the learning value selection means being for selecting a learning value so that the second learning value is used with respect to the small injection that is executed second or later when the small injection is executed second or later after elapse of the predetermined period.

By using different learning values in accordance with the injection order, a suitable learning value can be reflected with respect to the small injection in a state in which the internal state of the fuel receiving part at the time of execution of the learning is aligned with the actual internal state of the fuel receiving part at the time of execution of the small injection. Consequently, the amount of fuel injected with the small injection can be controlled accurately.

Moreover, the pre-learning injection in the present invention may be executed, prior to execution of the learning-use injection, during a period from a time when an in-cylinder pressure becomes stable in an expansion stroke at one cycle before a cycle in which execution of the learning-use injection is scheduled, to a time that is earlier, by a predetermined time, than an execution timing of the learning-use injection at the cycle in which execution of the learning-use injection is scheduled.

This makes it possible to surely prevent the fuel receiving part from being in a gas-tight state after the execution of the pre-learning injection.

DESCRIPTION OF EMBODIMENTS

First Embodiment

[System Configuration of Internal Combustion Engine]

Figure 1:
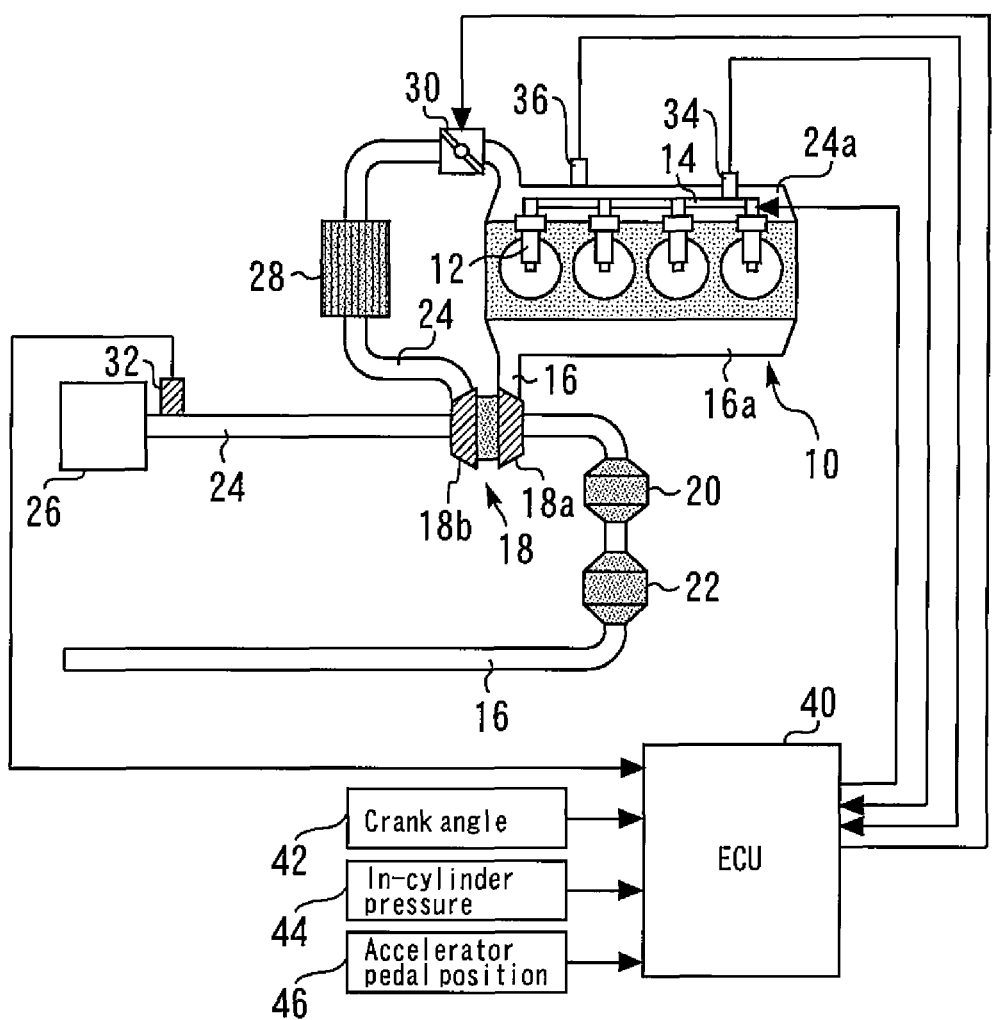
FIG. 1 is a diagram for explaining a system configuration of an internal combustion engine according to a first embodiment of the present invention.

FIG. 1 is a diagram for explaining a system configuration of an internal combustion engine 10 according to a first embodiment of the present invention. The system shown in FIG. 1 includes an internal combustion engine 10. It is assumed herein that the internal combustion engine 10 is a four-cycle diesel engine (compression ignition internal combustion engine) 10 and is mounted in a vehicle to work as its power source. Although the internal combustion engine 10 of the present embodiment is of an in-line four-cylinder type, the number and arrangement of cylinders in the internal combustion engine in the present invention are not limited to the foregoing.

A fuel injection valve 12 for directly injecting fuel into a cylinder is installed in each cylinder of the internal combustion engine 10. One example of the detailed configuration of a injection part of the fuel injection valve 12 will be described later with reference to FIG. 2. The fuel injection valve 12 of each cylinder is connected to a shared common rail 14. In the common rail 14, a high pressure fuel which is pressurized by a supply pump (not shown) is supplied. Then, from this common rail 14, the fuel is supplied to the fuel injection valve 12 of each cylinder. The exhaust gas discharged from each cylinder is collected by an exhaust manifold 16a to flow into an exhaust passage 16.

The internal combustion engine 10 includes a turbo supercharger 18. The turbo supercharger 18 includes a turbine 18a which is operated by exhaust energy of exhaust gas, and a compressor 18b which is integrally coupled to the turbine 18a via a connection shaft and is driven to rotate by the exhaust energy of the exhaust gas input to the turbine 18a. The turbine 18a of the turbo supercharger 18 is disposed at some point in the exhaust passage 16. At a downstream side of the turbine 18a in the exhaust passage 16, an oxidation catalyst 20 and a DPF (Diesel Particulate Filter) 22 are installed in series in the order from the upstream side, in order to purify exhaust gas.

An air cleaner 26 is provided in the vicinity of the inlet of an intake passage 24 of the internal combustion engine 10. The air suctioned through the air cleaner 26 is compressed by the compressor 18b of the turbo supercharger 18 and thereafter is cooled by an intercooler 28. The suctioned air which has passed through the intercooler 28 is distributed by an intake manifold 24a to flow into each cylinder. An intake throttle valve 30 is installed in the intake passage 24 between the intercooler 28 and the intake manifold 24a.

An air flow meter 32 for detecting the amount of intake air is installed near the downstream of the air cleaner 26 in the intake passage 24. At the common rail 14, a common rail pressure sensor 34 is installed for detecting a fuel pressure in the common rail 14. In addition, at the intake manifold 24a, an intake air pressure sensor 36 is installed for detecting an intake manifold pressure (boost pressure).

Furthermore, the system of the present embodiment includes an ECU (Electronic Control Unit) 40. Various sensors for detecting an operational state of the internal combustion engine 10, such as a crank angle sensor 42 for detecting an engine speed, and an in-cylinder pressure sensor 44 for detecting an in-cylinder pressure, in addition to the air flow meter 32, the common rail pressure sensor 34 and the intake air pressure sensor 36 that are described above, are connected to an input section of the ECU 40. In addition, an accelerator position sensor 46 is connected to the ECU 40 to detect a depression amount of an accelerator (accelerator pedal position) of a vehicle equipped with the internal combustion engine 10. Further, various actuators for controlling the operation of the internal combustion engine 10, such as the fuel injection valve 12 and the intake throttle valve 30 that are described above, are connected to an output section of the ECU 40. The ECU 40 controls the operational state of the internal combustion engine 10 by driving the above described various actuators in accordance with predetermined programs and the outputs of those sensors.

Figure 2:
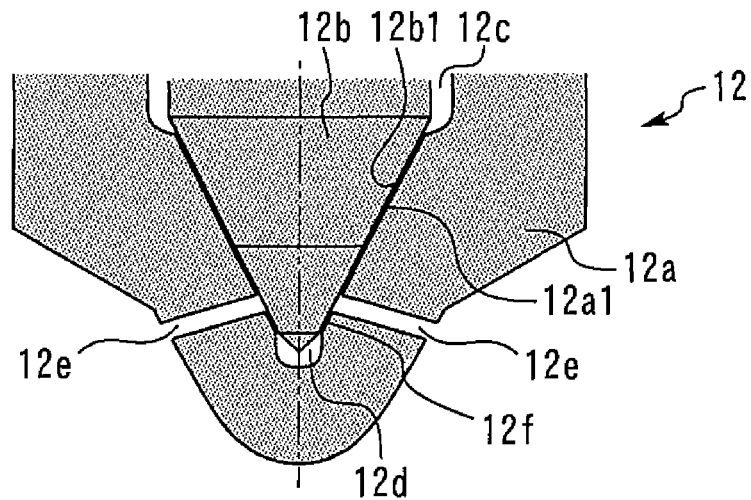
FIG. 2 is a sectional view illustrating a configuration of a distal end part at a side in which fuel injection is executed in the fuel injection valve shown in FIG. 1.

FIG. 2 is a sectional view illustrating a configuration of a distal end part at a side in which fuel injection is executed in the fuel injection valve shown in FIG. 1.

As shown in FIG. 2, the fuel injection valve 12 includes a nozzle body 12a. A needle valve 12b having a conically-shaped distal end part is disposed inside the nozzle body 12a so as to reciprocally move. An internal fuel passage 12c through which fuel passes is formed between the inner peripheral surface of the nozzle body 12a and the outer peripheral surface of the needle valve 12b. A high pressure fuel is supplied into the internal fuel passage 12c from an upper side of the internal fuel passage 12c shown in FIG. 2.

On the inner peripheral surface of the nozzle body 12a in the vicinity of the conically-shaped distal end part of the needle valve 12b, a seat part 12a1 on which a seat contact part 12b1 of the needle valve 12b can be seated is formed. More specifically, the needle valve 12b is configured so as to be seated on the seat part 12a1 when an electromagnet (not shown) that is included by the fuel injection valve 12 does not generate a magnetic force. In this case, the flow of fuel toward a downstream side of the seat part 12a1 is shut off. Further, the needle valve 12b is configured so as to leave the seat part 12a1 when the electromagnet receives a supply of an excitation current and generates a magnetic force. As a result of this, the high pressure fuel that is being stored upstream of the seat part 12a1 is supplied downstream of the seat part 12a1.

Further, at the downstream side of the seat part 12a1 in the nozzle body 12a, a fuel receiving part (hereinafter, also referred to as a "sac") 12d and a plurality of nozzle holes (two of them are illustrated in FIG. 2) 12e are formed as shown in FIG. 2. The sac 12d is a part at which fuel can be received as a result of the fuel being supplied from the upstream side at the time of opening the needle valve 12b. The nozzle holes 12e are formed in the nozzle body 12a between the sac 12d and the seat part 12a1. In this connection, the plurality of the nozzle holes 12e are provided at a predetermined angular interval with the central axis line of the fuel injection valve 12 as a center so that fuel can be injected in a radial fashion.

Furthermore, in a state in which the needle valve 12b is seated on the seat part 12a1 (valve closed state) as shown in FIG. 2, the needle valve 12b is configured so that a part of the distal end part thereof is in contact with a wall surface 12f of the nozzle body 12a that is at a side closer to the sac 12d with respect to the nozzle holes 12e. As a result of this, in a state in which the needle valve 12b is seated on the seat part 12a1, the communication between the sac 12d and each nozzle hole 12e is also shut off. That is to say, the fuel injection valve 12 of the present embodiment is a fuel injection valve of a so-called VCO (Valve Covered Orifice) type.

[Learning Control of Small Injection Amount]

Now that exhaust emission regulations has been tightened, requirements for the accuracy of fuel injection with small amount such as pilot injection has been increasing. Accordingly, in the internal combustion engine 10 of the present embodiment, learning control of small injection amount is executed during operation in order to correct a change in the small injection amount due to individual variability or change with time of the fuel injection valve.

More specifically, according to the present learning control, fuel injection with a predetermined small injection amount is successively executed from one cylinder after another when the engine speed is decreased to a predetermined value during performance of a fuel cut operation at the time of deceleration. This fuel injection is executed at a timing at which combustion is enabled (for example, near the compression top dead center). The small injection amount is an amount that is smaller than a fuel amount necessary for an idle operation. According to the present learning control, a variation ΔNe of engine speed in association with a fuel injection with the fuel amount described above is measured, and then an estimated injection amount Qv is calculated which is equivalent to a torque that generates the above variation ΔNe of engine speed. Further, a correction amount of fuel injection amount necessary to eliminate the difference between the estimated injection amount Qv and an injection amount commanded to the fuel injection valve 12 is calculated as a learning value, and stored in the ECU 40. Furthermore, an arrangement is made such that when the small injection such as pilot injection is executed, fuel injection is executed with a corrected fuel amount based on the aforementioned correction amount (learning value). In this manner, the learning control of the small injection amount is executed.

[Issues with First Embodiment]

As described above, according to the fuel injection valve 12 of the VCO type, at the time of finishing the lift operation of the needle valve 12b, fuel supply from the internal fuel passage 12c is shut off as a result of the needle valve 12b being seated on the seat part 12a1, and the communication between the sac 12d and the nozzle holes 12e is also shut off as a result of the distal end part of the needle valve 12b coming into contact with the wall surface 12f. Thus, it is expected that a state in which the inside of the sac 12d during valve closing is basically filled with a liquid (hereinafter, referred to as a "liquid-tight state") will be realized.

However, when the fuel injection valve 12 is brand new, mechanical familiarity (lapping) is not being ensured concerning the contact between the needle valve 12b and the nozzle body 12a. In addition, the rotational displacement of the needle valve 12b inside the nozzle body 12a, generally, is not restricted, and therefore, the rotational position of the needle valve 12b with respect to the nozzle body 12a may vary for every lift operation. Because of these factors, when the needle valve 12b is seated on the seat part 12a1 in the brand new state, a gap may be formed between the distal end part of the needle valve 12b and the wall surface 12f depending on the aforementioned rotational position, and the communication between the sac 12d and the nozzle holes 12e may not be shut off.

Furthermore, from the fuel injection valve 12, fuel with high pressure of tens to hundreds of MPa is vigorously injected. For this reason, in a case such as that the aforementioned gap is formed, even after the needle valve 12b is seated on the seat part 12a1, part of fuel in the sac 12d attempts to go outside via the aforementioned gap by the inertia thereof. As a result of this, gas may enter into the sac 12d instead of the fuel that has been actually discharged from the sac 12d, and bubbles of the gas may be generated in the sac 12d.

When the in-cylinder pressure (that is, pressure outside the nozzle holes 12e) decreases as a result of reaching the expansion stroke under a situation in which the gas bubbles are present in the sac 12d as described above, the gas in the sac 12d expands. As a result, if the fuel in the sac 12d is extruded by the expanded gas, there becomes a state in which the inside of the sac 12d is filled with the gas (hereinafter, referred to as a "gas-tight state").

Incidentally, in order to clearly express the internal state of the sac 12d, the present description uses the terms "liquid-tight state" and "gas-tight state" that are defined as above. However, the "liquid-tight state" in the present description does not denote only a state in which the inside of the sac 12d is filled with 100% liquid exactly, and similarly, the "gas-tight state" does not denote only a state in which the inside of the sac 12d is filled with 100% gas exactly. More specifically, in the present description, the term "liquid-tight state" is used including a state in which although there are some gas bubbles in the inside of the sac 12d, it can be roughly said that the sac is filled with liquid, and, similarly, the term "gas-tight state" is used including a state in which although there is some liquid in the inside of the sac 12d, it can be roughly said that the sac is filled with the gas. That is to say, the terms "liquid-tight state" and "gas-tight state" in the present description are used to distinguish a state in which the amount of fuel that is filled in the sac 12d is relatively large and a state in which it is relatively small.

Figure 3:
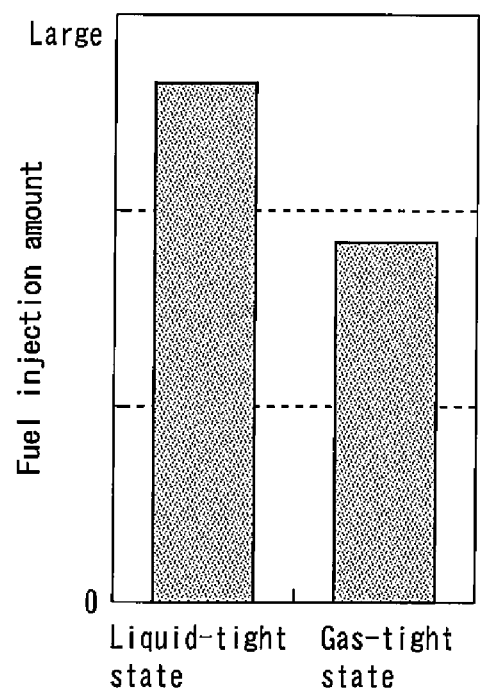
FIG. 3 is a diagram expressing fuel injection amounts that are injected from nozzle holes as compared between a liquid-tight state and a gas-tight state concerning the inside of a sac.
Figure 4:
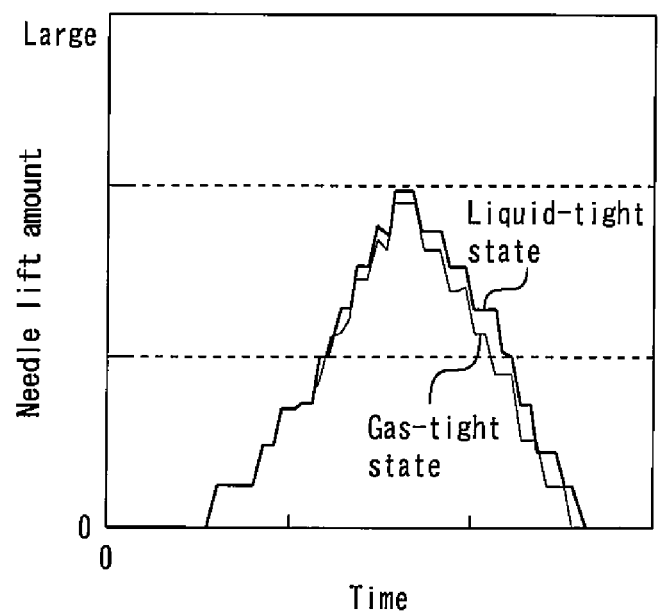
FIG. 4 is a diagram expressing the lift amounts of a needle valve as compared between the liquid-tight state and the gas-tight state concerning the inside of the sac.

FIG. 3 is a diagram expressing fuel injection amounts that are injected from the nozzle holes 12e as compared between the liquid-tight state and the gas-tight state concerning the inside of the sac 12d. In addition, FIG. 4 is a diagram expressing the lift amounts of the needle valve 12b as compared between the liquid-tight state and the gas-tight state concerning the inside of the sac 12d. FIGS. 3 and 4 are based on the data obtained when the small injection is executed.

When the small injection is executed in the gas-tight state, as shown in FIG. 3, the amount of fuel that is actually injected from the nozzle holes 12e decreases as compared with a case in which the similar injection is executed in the liquid-tight state. One of the reasons is that fuel is used for filling up the sac 12d in the gas-tight state. In addition, a further reason is that as shown in FIG. 4, the lift amount of the needle valve 12b decreases in the gas-tight state due to a decrease in upward force of the needle valve 12b generated by the fuel in the sac 12d, as compared with in the liquid-tight state. Although the change in the fuel injection amount is herein described as an example, injection amount characteristics other than the fuel injection amount, and fuel spray also greatly vary depending on the difference whether the internal state of the sac 12d when fuel injection is started is the liquid-tight state or the gas-tight state.

Further, as described above, when the fuel injection valve 12 is brand new, the rotational position of the needle valve 12b with respect to the nozzle body 12a may vary for every lift operation. Therefore, in the brand new state, the above described gap may be formed depending on the aforementioned rotational position. As a result of this, the sac 12d when fuel injection is started is exposed to the phenomenon in which the internal state thereof varies between the liquid-tight state and the gas-tight state. If the aforementioned phenomenon arises at the time of execution of the learning control of the small injection amount, the injection amount of fuel that is actually injected from the nozzle holes 12e varies. This may produce a variation in the learning results. In other words, an erroneous learning may occur.

[Characteristic Control in First Embodiment]

Accordingly, in the present embodiment, prior to execution of the small injection (learning-use injection) for the learning control of the small injection amount, a filling-use injection (pre-learning injection) is executed to fill the inside of the sac 12d by fuel so as to be the liquid-tight state. Specifically, the amount of filling-use injection in this situation just has to be an ultramicro amount (for example, 1 mm3/st or less) only for filling the inside of the sac 12d by fuel while being prevented from disturbing the learning control of the small injection amount. In addition, this fuel injection amount may, for example, be an amount equivalent to the volume of the sac 12d.

Figure 5:
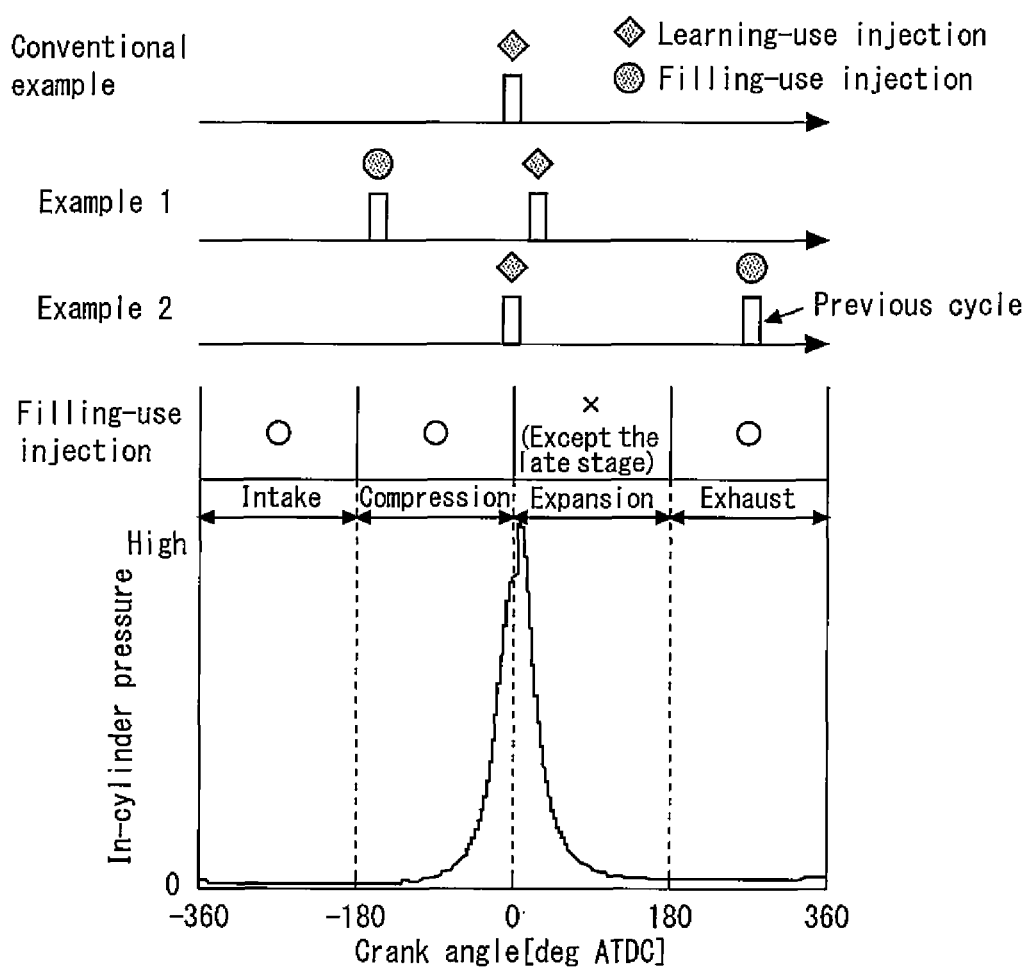
FIG. 5 is a diagram for explaining the execution timings of learning-use injection and filling-use injection (pre-learning injection)

FIG. 5 is a diagram for explaining the execution timings of the learning-use injection and the filling-use injection (pre-learning injection).

In a case in which the filling-use injection is not executed as shown "Conventional example" in FIG. 5, the learning-use injection is generally executed at a predetermined timing immediately before the compression top dead center. On the other hand, the timing of the filling-use injection in the present embodiment is a timing in which the in-cylinder pressure does not decrease before the learning-use injection starts after the filling-use injection is executed, in order to prevent the inside of the sac 12d from becoming the gas-tight state due to a leak of fuel that is filled in the sac 12d.

Specifically, if the filling-use injection is executed with the learning-use injection at the same cycle, the execution timing of the filling-use injection is set to a desired timing during the intake and compression strokes, as shown in FIG. 5. However, in order to be prevented from being affected by the filling-use injection, the learning-use injection in this case is executed after a predetermined interval (for example, about 90 degrees CA) elapses from the execution of the filling-use injection. It is conceivable that engine speed fluctuation and pressure fluctuation of fuel in the common rail 14 that accompany the execution of the filling-use injection correspond to the effects due to the filling-use injection. Therefore, an arrangement is made such that the learning-use injection waits until the effects converge. When the filling-use injection is executed at the compression stroke, there is a possibility that combustion in association with the filling-use injection may occur near the compression top dead center. Accordingly, in such a case, the execution timing of the learning-use injection is retarded more than normal, as shown "Example 1" in FIG. 5.

In addition, if the filling-use injection is executed at one cycle before a cycle at which the learning-use injection is executed, the execution timing of the filling-use injection is avoided to be set to a timing in a period (the early stage of the expansion stroke) in which the in-cylinder pressure is decreasing after the filling-use injection, and the execution timing is set to a timing (that is, the late stage of the expansion stroke, and the exhaust stroke) that is after the in-cylinder pressure becomes stable as a result of convergence of the decrease in the pressure.

By setting the execution timing of the filling-use injection prior to the learning-use injection by the procedure as above, the early stage of the expansion stroke is avoided to be interposed between the filling-use injection and the learning-use injection. Therefore, the learning-use injection can be executed after surely putting the inside of the sac 12d into the liquid-tight state.

Figure 6:
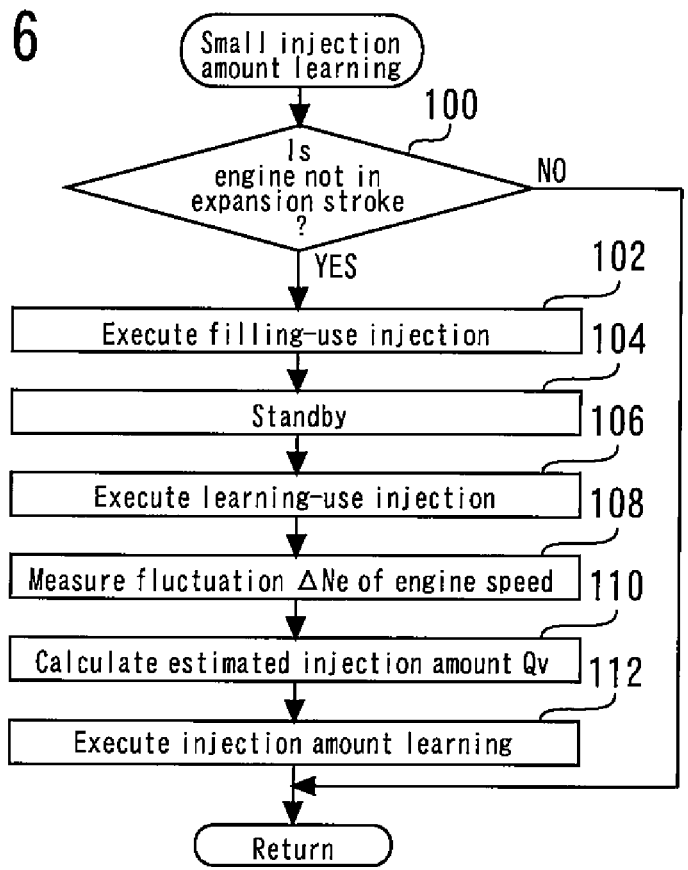
FIG. 6 is a flowchart of a routine that is executed in the first embodiment of the present invention.

FIG. 6 is a flowchart of a routine that is executed by the ECU 40 in the first embodiment to implement the learning control of the small injection amount according to the first embodiment of the present invention. It is assumed that the present routine is started when the engine speed has decreased to a predetermined value or less at the time of deceleration in association with execution of fuel cut.

In the routine shown in FIG. 6, first, it is determined, using the crank angle sensor 42, whether the engine is not in (the early stage of) the expansion stroke (step 100). As already described, during the expansion stoke (especially, the early stage thereof), the in-cylinder pressure decreases. In the ECU 40, a crank angle period in which a decrease in such in-cylinder pressure occurs is stored in advance. In present step 100, it is determined whether the present crank angle is not located in the aforementioned crank angle period.

If the determination of step 100 is established, the filling-use injection is executed (step 102). Specifically, when being executed at the same cycle as the learning-use injection, the filling-use injection is executed at a predetermined timing during a period from the start of the intake stroke to the end of the compression stroke. In addition, when being executed at one cycle prior to the learning-use injection, the filling-use injection is executed at a predetermined timing during a period from the start of the expansion stroke to the end of the exhaust stroke after the elapse of the aforementioned crank angle period.

Next, a processing to stand by the learning-use injection is executed so that at least a predetermined period (for example, 90 degrees CA) which starts from the execution of the filling-use injection in step 102 is secured (step 104). Then, the learning-use injection is executed at a predetermined execution timing in which combustion is possible (step 106).

Next, the fluctuation ΔNe of engine speed that accompanies the execution of the learning-use injection is measured (step 108). Then, the estimated injection amount Qv that is equivalent to a torque that produces the measured fluctuation ΔNe of engine speed is calculated (step 110). Then, a processing to learn the small injection amount is executed (step 112). Specifically, a correction amount (a learning value) of the fuel injection amount is calculated and stored in the ECU 40. The correction amount is needed to eliminate the difference between the estimated injection amount Qv which is calculated and the command value of the learning-use injection that is executed in step 106. The correction amount that is calculated in this way is used when the small injection such as pilot injection is executed hereafter.

According to the routine shown in FIG. 6 described so far, prior to the execution of the learning-use injection, the filling-use injection (pre-learning injection) for filling the sac 12d by fuel is executed. As a result, the learning-use injection can be executed after the inside of the sac 12d is surely put in the liquid-tight state. This can stabilize the injection amount of fuel that is actually injected from the nozzle holes 12e, and can therefore suppress a variation in the learning values of the small injection amount for the learning control of the small injection amount. Because of this, the learning accuracy of the small injection amount can be improved. Furthermore, the influences on the variation in the learning values of the fuel injection amount due to the difference based on whether the internal state of the sac 12d is the liquid-tight state and the gas-tight state becomes especially prominent in a case in which the learning control of the small injections (such as pilot injection) as executed in the present embodiment is executed. In other words, the execution of the filling-use injection prior to the execution of the learning-use injection is remarkably effective as a method for improving the learning accuracy of the small injection amount with a simple configuration.

Moreover, according to the above described routine, the filling-use injection is executed while avoiding the early stage of the expansion stroke, that is, a period in which the in-cylinder pressure is decreasing. This makes it possible to prevent the inside of the sac 12d that is surely in the liquid-tight state due to the execution of the filling-use injection, from changing into the gas-tight state before the learning-use injection is executed.

In the above described first embodiment, the explanation of the control in the present embodiment has been made taking an example of the fuel injection valve 12 of the VCO type (see FIG. 2). As already described, according to such fuel injection valve 12 of the VCO type, a gap may be formed between the distal end part of the needle valve 12*b* and the wall surface 12*f* depending on the rotational position of the needle valve 12*b* at the time of being seated on the seat part 12*a*1, especially in the brand new state. As a result of this, the sac 12*d* when fuel injection is started is exposed to the phenomenon in which its internal state varies between the liquid-tight state and the gas-tight state. Therefore, a learning variation may arise in the learning control of the small injection amount if the filling-use injection in the present embodiment is not executed in advance. However, the configuration of a fuel injection valve that is applied to the present invention is not limited to the one of the VCO type described above.

More specifically, a fuel injection valve that is applied to the present invention requires simply that a nozzle body is provided which includes a fuel receiving part provided downstream of a seat part with which a seat contact part of a needle valve comes into contact, and at least one nozzle hole. For example, a fuel injection valve (so-called, a fuel injection valve of MS (Mini Sac) nozzle type) may be used that includes a configuration in which the distal end part of a needle valve is not extended to the extent that the communication between a nozzle hole and a fuel receiving part (sac) can be shut off as in the VCO type and in which the nozzle hole is connected with a sac (fuel receiving part) of small volume. Even if a fuel injection valve has such a configuration, the amount of fuel extruded from the sac by the expanded gas bubbles at the early stage of the expansion stroke varies due to a variation in the amount of the gas bubbles existing in the sac after execution of injection. This becomes a cause for a variation in the learning value at the time of the execution of the learning control of the fuel injection amount such as small injection amount. Therefore, application of the control of the above described present embodiment is effective also in an internal combustion engine that includes the fuel injection valve having the aforementioned configuration.

It is noted that in the above described first embodiment, the ECU 40 performs the aforementioned processing of steps 106 to 110, whereby the "learning execution means" according to the present invention is realized; and the ECU 40 performs the aforementioned processing of steps 100 to 104, whereby the "pre-learning injection execution means" according to the present invention is realized.

Second Embodiment

Next, a second embodiment of the present invention will be described with reference to FIGS. 7 and 8.

The system of the present embodiment can be implemented by using the hardware configuration shown in FIG. 1 and making the ECU 40 execute the routine shown in FIG. 7 described below, in addition to the routine shown in FIG. 6.

As described so far, according to the fuel injection valve 12 of the VCO type, in the brand new state in which mechanical familiarity is not being ensured concerning the contact between the needle valve 12*b* and the nozzle body 12*a*, the internal state of the sac 12*d* may vary between the liquid-tight state and the gas-tight state depending on the rotational position of the needle valve 12*b* at the time of being seated on the seat part 12*a*1. However, the degree of outflow of fuel from the sac 12*d* at the time of a decrease in the in-cylinder pressure during the expansion stroke may vary with time. For example, in the case of the VCO type, the familiarity between the needle valve 12*b* and the nozzle body 12*a* is gradually ensured by repeating the lift operation of the needle valve 12*b*, and as a result of this, basically, the communication between the sac 12*d* and the nozzle holes 12*e* is stably shut off when the valve is being closed. Therefore, the internal state of the sac 12*d* at the time of the learning of the small injection amount becomes stable in the liquid-tight state. Incidentally, even if the VCO type is not adopted (for example, even if the MS nozzle type is adopted), a change in the amount of gas bubbles that flows into the sac (fuel receiving part) after execution of fuel injection has the potential to change the degree of outflow of fuel from the inside of the sac 12*d* with time.

Accordingly, in the present embodiment, it is determined whether or not the internal state of the sac 12*d* is stable in the liquid-tight state (whether or not there is the necessity of executing the filling-use injection (pre-learning injection) in the above described first embodiment at the time of the learning control of the small injection amount). In addition, the normal learning control of the small injection amount without being accompanied by the filling-use injection is executed if it can be judged that the internal state of the sac 12*d* is stable in the liquid-tight state, and, on the other hand, the learning control of the small injection amount in the first embodiment with the filling-use injection is executed if it can be judged that the internal state of the sac 12*d* is not stable in the liquid-tight state.

Figure 7:
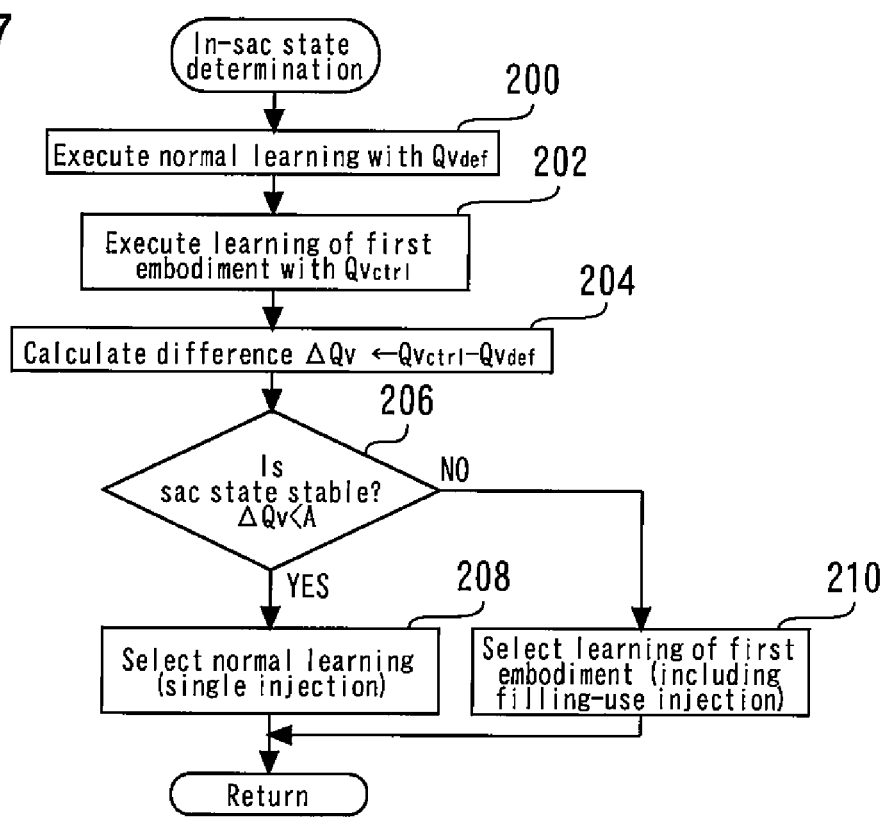
FIG. 7 is a flowchart of a routine that is executed in a second embodiment of the present invention.

FIG. 7 is a flowchart of a routine that is executed by the ECU 40 in the present second embodiment to switch execution modes of the learning control of the small injection amount in accordance with the results of determination of the internal state of the sac 12*d*. The processing of the present routine is performed each time before executing the learning control of the small injection amount, or it is performed once whenever the learning control has been executed a predetermined plurality of times.

In the routine shown in FIG. 7, first, the normal learning (the learning control of the small injection amount without being accompanied by the filling-use injection) is executed, and an estimated injection amount $Qv_{def}$ is calculated on the basis of the fluctuation $\Delta$Ne of engine speed in this case (step 200). Next, under the same operating condition as that in step 200, the learning of the first embodiment (the learning control of the small injection amount with the filling-use injection) is executed, and an estimated injection amount $Q_{Vctrl}$ is calculated on the basis of the fluctuation $\Delta$Ne of engine speed in this case (step 202).

Next, a difference $\Delta$Qv between the calculated two estimated injection amounts $Q_{Vctrl}$ and $Q_{Vdef}$ is calculated (step 204). Next, it is determined whether or not the difference $\Delta$Qv is smaller than a predetermined value A (step 206).

The learning of the first embodiment is executed after putting the internal state of the sac 12*d* in the liquid-tight state, whereas the normal learning is executed in a situation in which the internal state of the sac 12*d* is not under control (in a situation in which it is unknown whether the liquid-tight state or the gas-tight state is established). If the normal learning is executed in the liquid-tight state, the two estimated injection amounts $Q_{Vctrl}$ and $Q_{Vdef}$ become equal or a value close thereto. If, on the other hand, the normal learning is executed in the gas-tight state, the estimated injection amount $Q_{Vdef}$ at the time of the normal learning becomes smaller than the estimated injection amount $Q_{Vctrl}$ for the reasons described above with reference to FIGS. 3 and 4. Therefore, the aforementioned difference $\Delta$Qv in this case becomes a positive value. According to the present processing of step 206, by setting the aforementioned predetermined value A in advance as a value that can be used to discriminate between those two cases, it can be judged whether or not the internal state of the sac 12d is stable in the liquid-tight state on the basis of the magnitude of the aforementioned difference ΔQv. Incidentally, such determination based on the difference ΔQv may be made with reference to a record of the values of ΔQv that were previously calculated, instead of use of the result of a one-time calculation.

When it is determined in step 206 that the aforementioned difference ΔQv is smaller than the predetermined value A, that is to say, it can be judged that the internal state of the sac 12d is stable in the liquid-tight state due to a variation with time (for example, the familiarity between the needle valve 12b and the nozzle body 12a), the normal learning using a single injection without being accompanied by the filling-use injection is selected (step 208). When, on the other hand, it is determined in step 206 that the aforementioned difference ΔQv is larger than or equal to the predetermined value A, that is to say, it can be judged that the internal state of the sac 12d is not stable in the liquid-tight state, the learning of the first embodiment with the filling-use injection is selected (step 210).

As described so far, the routine shown in FIG. 7 determines whether or not the internal state of the sac 12d is stable in the liquid-tight state. This allows the learning control with the filling-use injection to be executed only in a situation that can be judged that there is a possibility of occurrence of a variation in the learning values (occurrence of an erroneous learning). Therefore, an unnecessary filling-use injection can be prevented from being executed in a situation in which the internal state of the sac 12d is stable in the liquid-tight state.

Meanwhile, fuel injection to obtain the two estimated injection amounts $Qv_{Vdef}$ and $Qv_{Vctrl}$ in the above described second embodiment may be executed in a mode described below. More specifically, at a timing in which combustions can be done in the same cycle, the filling-use injection and the learning-use injection are sequentially executed with command values that request the same fuel injection amount. Further, the estimated value of the fuel injection amount by the filling-use injection is used as the aforementioned estimated injection amount $Qv_{Vdef}$, and the estimated value of the fuel injection amount by the learning-use injection is used as the aforementioned estimated injection amount $Qv_{Vctrl}$. Also with such method, the estimated injection amount $Qv_{Vdef}$ in a state in which the internal state of the sac 12d is not under control can be obtained with the aforementioned filling-use injection, and the estimated injection amount $Qv_{Vctrl}$ in a state in which the internal state of the sac 12d is the liquid-tight state can be obtained with the learning-use injection thereafter.

Moreover, if multi injection is used, the fuel injection to obtain the two estimated injection amounts $Qv_{Vdef}$ and $Qv_{Vctrl}$ in the above described second embodiment may be executed in a mode as described with reference to following FIG. 8. The multi injection here is a fuel injection that includes a main injection for generating torque and predetermined small injections arbitrarily executed before and after the main injection.

Figure 8:
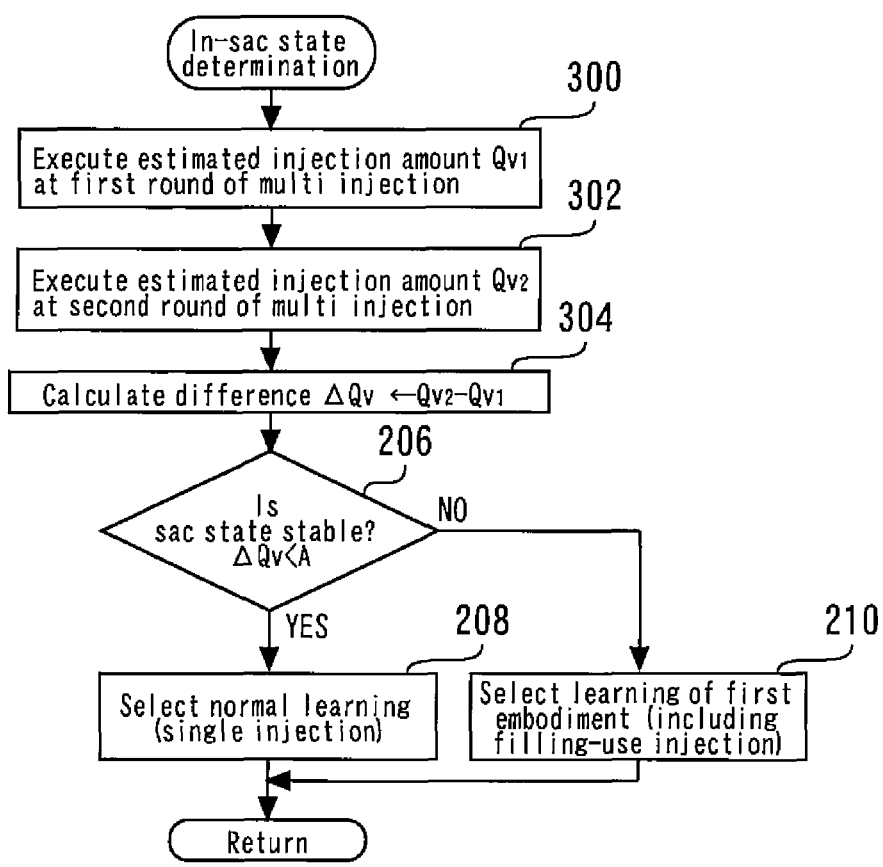
FIG. 8 is a flowchart of a routine that is executed in a modified embodiment of a second embodiment of the present invention.

FIG. 8 is a flowchart of a routine corresponding to a modified embodiment with respect to the determination method of the internal state of the sac 12d according to the second embodiment of the present invention.

In the routine shown in FIG. 8, first, the estimated injection amount $Qv_1$ based on the variation ΔNe of engine speed as a result of the first fuel injection in the multi injection is calculated (step 300). As one example, a case is assumed herein that, although a post injection for warming up the catalysts (the oxidation catalyst 20 and the like) is not executed, two pilot injections, for example, are executed, prior to the main injection, in the compression stroke in order to improve ignitability of fuel at the main injection. In such a case, the first pilot injection corresponds to the first fuel injection in the multi injection.

Next, the estimated injection amount $Qv_2$ based on the variation ΔNe of engine speed as a result of the second fuel injection in the multi injection is calculated (step 302). In the above described case, the second pilot injection corresponds to the second fuel injection in the multi injection. However, the command values of the fuel injection amounts in these first and second pilot injections are conditional on the same value.

Next, a difference ΔQv of the calculated two estimated injection amounts $Qv_2$ and $Qv_1$ is calculated (step 304). The detailed description of the processing after this step 304 will be omitted herein since it is similar to that of the routine shown in FIG. 7.

In the processing of the routine shown in FIG. 8 described so far, the first fuel injection in the aforementioned multi injection is executed in a situation in which the internal state of the sac 12d is not under control (in a situation in which it is unknown whether the liquid-tight state or the gas-tight state is established). Further, the second fuel injection in the multi injection is executed after the inside of the sac 12d is put into the liquid-tight state by the first fuel injection. The processing of the above described routine can therefore determine the internal state of the sac 12d using predetermined small injections included in the multi injection that is executed to improve exhaust emission and fuel efficiency. In addition, on the basis of the determination results, the filling-use injection in the first embodiment is allowed to be executed only when it is judged that there is a possibility of occurrence of the learning variation (occurrence of an erroneous learning).

Moreover, in the above described second embodiment, it is judged on the basis of the magnitude of the difference ΔQv between the two estimated injection amounts $Qv_{def}$ and $Qv_{ctrl}$ whether or not the internal state of the sac 12d is stable in the liquid-tight state. However, the first and second learning parameters in the present invention are not limited to the example that is used for the aforementioned estimated injection amounts $Qv_{def}$ and $Qv_{ctrl}$. More specifically, as the learning parameters, for example, the above described learning value (the correction amount) in the learning control of the small injection amount may be used instead of the estimated injection amounts $Qv_{def}$ and $Qv_{ctrl}$.

It is noted that in the above described second embodiment, the ECU 40 performs the aforementioned processing of step 200, whereby the "first learning parameter calculation means" according to the present invention is realized; the ECU 40 performs the aforementioned processing of step 202, whereby the "second learning parameter calculation means" according to the present invention is realized; and the ECU 40 performs the aforementioned processing of steps 204 to 210, whereby the "injection mode switching means" according to the present invention is realized.

Moreover, in the above described second embodiment, the estimated injection amount $Qv_{def}$ corresponds to the "first learning parameter" according to the present invention; and the estimated injection amount $Qv_{ctrl}$ corresponds to the "second learning parameter" according to the present invention.

Moreover, in the above described modified embodiment of the second embodiment, the ECU 40 performs the small injections accompanied by the learning in steps 300 and 302, whereby the "multi injection execution means" according to the present invention is realized.

Furthermore, in the above described variation example of the second embodiment, the estimated injection amount $Qv_1$ corresponds to the "first learning parameter" according to the present invention; and the estimated injection amount $Qv_2$ corresponds to the "second learning parameter" according to the present invention.

Third Embodiment

Next, a third embodiment of the present invention will be described with reference to FIGS. 9 and 10.

The system of the present embodiment can be implemented by using the hardware configuration shown in FIG. 1 and making the ECU 40 execute the routine shown in FIG. 10 described below, in addition to the routine shown in FIG. 6. However, it is assumed in the present embodiment that a fuel injection valve of the aforementioned MS nozzle type is included instead of the fuel injection valve 12 of the VCO type.

If a fuel injection valve of the MS nozzle type is used in which a sac (fuel receiving part) is in communication with nozzle holes even when a needle valve is seated on a seat part of a nozzle body, the internal state of the sac at the time of the start of fuel injection varies steadily between the liquid-tight state and the gas-tight state. As a result of this, when the multi injection is executed, the internal state of the sac varies depending on the execution order of each small injection in the multi injection. Nevertheless, if the same learning value is used without considering whether the internal state of the sac is the liquid-tight state or the gas-tight state, the small injection becomes unable to be executed with an accurate fuel injection amount.

Specifically, the learning is executed so as to increase the small injection amount under the gas-tight state as compared with that under the liquid-tight state. Therefore, executing the small injection under the liquid-tight state after the learning is executed under the gas-tight state results in that the fuel injection amount which is larger than an original and appropriate fuel injection amount is commanded to the fuel injection valve 12, and an increase in smoke emissions is caused. Conversely, executing the small injection under the gas-tight state after the learning is executed under the liquid-tight state results in that the fuel injection amount which is smaller than an original and appropriate fuel injection amount is commanded to the fuel injection valve 12, and there is a concern that misfire may occur.

Accordingly, in the present embodiment, the learning control of the small injection amount is executed in each state of the liquid-tight state and the gas-tight state. Specifically, the learning control of the small injection amount in the liquid-tight state is executed using the method of the first embodiment in which the filling-use injection is executed prior to the execution of the learning-use injection. Another learning control of the small injection amount in the gas-tight state is executed using the normal learning method in which a single learning-use injection is executed without being accompanied by the filling-use injection. The start timing of the learning-use injection in the normal learning control when the MS nozzle is used corresponds to a timing after a plurality of expansion strokes have elapsed during a fuel cut operation after the last fuel injection before the start of the fuel cut operation at the time of deceleration. Therefore, it is conceivable that the sac would be put into the gas-tight state as a result of the gas bubbles in the sac expanding and extruding the fuel. Thus, the small injection amount can be learned in the gas-tight state by performing the normal learning control that executes a single learning-use injection.

In addition, in the present embodiment, when the multi injection is executed, the learning value of the small injection amount at the gas-tight state is used with respect to the small injection that is executed first after a period in the expansion stroke during which the decrease rate of the in-cylinder pressure is high (mainly, the early stage) elapses (that is to say, after the in-cylinder pressure becomes stable), and the learning value of the small injection amount at the liquid-tight state is used with respect to the small injection that is executed secondly or later after the period elapses. Incidentally, the learning value of the small injection amount here is a value that is equivalent to a correction amount of the fuel injection amount necessary for eliminating the difference between the estimated injection amount Qv that is calculated on the basis of the fluctuation ΔNe of engine speed as a result of the learning-use injection and a command value of the learning-use injection.

Figure 9:
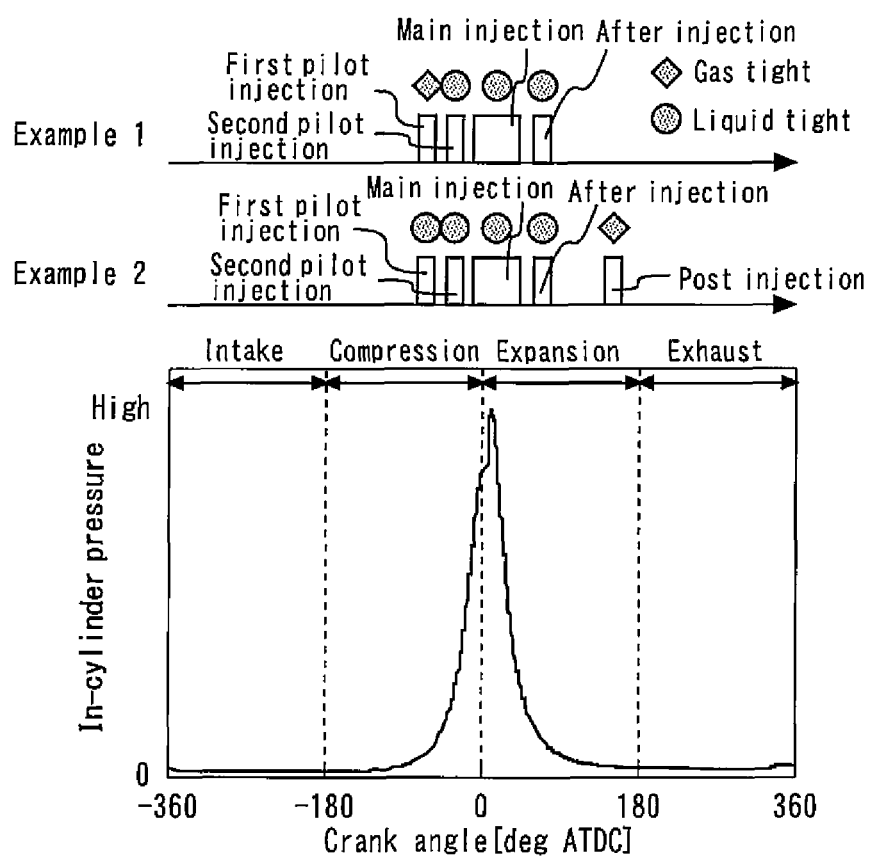
FIG. 9 is a diagram for showing an example of a method for using different learning values of small injection amount in accordance with the execution manner of multi injection.

FIG. 9 is a diagram for showing an example of a method for using different learning values of the small injection amount in accordance with the execution manner of the multi injection.

As shown in FIG. 9, in the present embodiment, an example 1 in which two pilot injections and one after injection are executed and an example 2 in which one post injection is executed in addition to each small injection of the example 1 are taken as examples of the multi injection. As already described, the pilot injection is an injection of small amount, which is executed in the compression stroke prior to the main injection in order to improve ignitability of fuel injected by the main injection, and here an example in which two pilot injections are executed is given. The after injection is an injection of small amount, which is executed in proximity to the main injection after execution of the main injection and which is executed with the purpose of, for example, facilitating reburning of soot that is caused by the main injection. As already described, the post injection is an injection that is executed in the late stage of the expansion stroke, or in the exhaust stoke in order to supply unburned fuel into the exhaust passage 16 without use for burning itself, for the purpose of warming of the catalysts (the oxidation catalyst 20 and the like).

In FIG. 9, in the case of the multi injection of the example 1 without being accompanied by the post injection, the first pilot injection corresponds to the small injection that is executed first after a period in the expansion stroke during which the decrease rate of the in-cylinder pressure is high (mainly, the early stage) elapses. Thus, in this case, the learning value of the small injection amount at the gas-tight state obtained by the normal learning control is used for the first pilot injection. Further, the remaining small injections, which are the second pilot injection and the after injection do not undergo a decrease in the in-cylinder pressure in the expansion stroke after execution of the last injection, and therefore, the learning value of the small injection amount at the liquid-tight state is used for the small injections.

On the other hand, in the case of the multi injection of the example 2 with the post injection in FIG. 9, the post injection corresponds to the small injection that is executed first after a period in the expansion stroke during which the decrease rate of the in-cylinder pressure is high (mainly, the early stage) elapses. Thus, in this case, the learning value of the small injection amount at the gas-tight state is used for the post injection. Further, the learning value of the small injection amount at the liquid-tight state is used for the remaining small injections, which are two pilot injections in total and the after injection.

Figure 10:
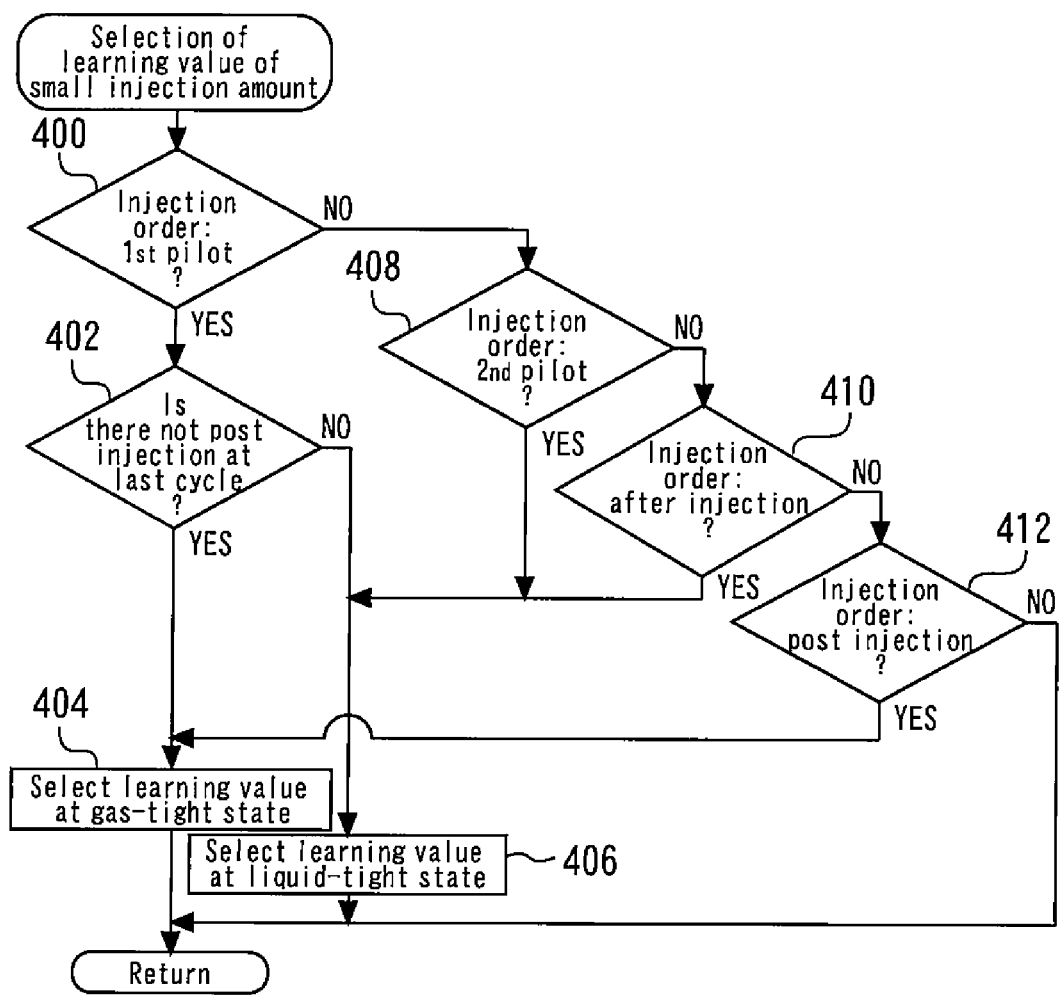
FIG. 10 is a flowchart of a routine that is executed in a third embodiment of the present invention.

FIG. 10 is a flowchart of a routine that is executed by the ECU 40 according to the present third embodiment to implement a control for using different learning values in accordance with the injection order of each small injection that is included in the multi injection. It is assumed that the present routine is repeatedly executed for every predetermined control period.

The injection order of each small injection in the multi injection is set in advance in accordance with the operational condition of the internal combustion engine 10. In the routine shown in FIG. 10, first, it is determined, with reference to the injection order corresponding to the present operation condition of the internal combustion engine 10, whether or not a timing of instruction to the fuel injection valve 12 for the first pilot injection has come (step 400).

If it is determined in step 400 that the aforementioned timing for the first pilot injection has come, it is determined whether or not the post injection was not executed in the last cycle (step 402). As a result, if it is determined that the post injection was not executed in the last cycle, that is to say, if the first pilot injection corresponds to a small injection that is executed first after a period in the expansion stroke during which the decrease rate of the in-cylinder pressure is high (mainly, the early stage) elapses, the learning value of the small injection amount at the gas-tight state is selected to correct the amount of the first pilot injection (step 404).

If, on the other hand, it is determined in step 402 that the post injection was executed in the last cycle, that is to say, if the first pilot injection corresponds to a small injection that is executed second or later after the period elapses, the learning value of the small injection amount at the liquid-tight state is selected to correct the amount of the first pilot injection (step 406).

If the determination of step 400 is not established, it is determined whether or not a timing of instruction to the fuel injection valve 12 for the second pilot injection has come (step 408). As a result, if it is determined that the aforementioned timing for the second pilot injection has come, the learning value of the small injection amount at the liquid-tight state is selected to correct the amount of the second pilot injection (step 406).

If the determination of step 408 is not established, it is determined whether or not a timing of instruction to the fuel injection valve 12 for the after injection has come (step 410). As a result, if it is determined that the aforementioned timing for the after injection has come, the learning value of the small injection amount at the liquid-tight state is selected to correct the amount of the after injection (step 406).

If the determination of step 410 is not established, it is determined whether or not a timing of instruction to the fuel injection valve 12 for the post injection has come (step 412). As a result, if it is determined that the aforementioned timing for the post injection has come, the learning value of the small injection amount at the gas-tight state is selected to correct the amount of the post injection because this is a case that undergoes a decrease in the in-cylinder pressure in the expansion stroke after execution of the last fuel injection (to which, in this case, the after injection in the same cycle corresponds) (step 404). In the processing of the present routine, the selection of the learning values by the aforementioned manner is not applied to the main injection.

However, the learning value that is selected on the basis of the similar manner may be reflected with respect to the main injection.

According to the routine shown in FIG. 10, which has been described so far, the learning value of the small injection amount at the gas-tight state is used with respect to the small injection that is executed first after the period in the expansion stroke in which the decrease rate of the in-cylinder is high (mainly, the early stage) elapses, and, on the other hand, the learning value of the small injection amount at the liquid-tight state is used with respect to the small injection that is executed second or later after the aforementioned period elapses. By using different learning values in accordance with the injection order, a suitable learning value can be reflected with respect to each small injection in a state in which the internal state of the sac at the time of execution of the learning is aligned with the actual internal state of the sac at the time of execution of each small injection. Consequently, the amount of fuel injected with each small injection such as the pilot injection can be controlled accurately.

It is noted that in the above described third embodiment, the ECU 40 performs the multi injection in the order of injection shown in FIG. 9, whereby the "multi injection execution means" according to the present invention is realized; the ECU 40 calculates the learning value at the gas-tight state using the normal learning method in which a single learning-use injection is executed without being accompanied by the filling-use injection, whereby the "first learning execution means" according to the present invention is realized; the ECU 40 calculates the learning value at the liquid-tight state using the learning method of the first embodiment in which learning-use injection is executed with the filling-use injection, whereby the "second learning execution means" according to the present invention is realized; and the ECU 40 performs a series of processing shown in FIG. 10, whereby the "learning value selection means" according to the present invention is realized.

Furthermore, in the third embodiment, the learning value of the small injection amount at the gas-tight state corresponds to the "first learning value" according to the present invention; and the learning value of the small injection amount at the liquid-tight state corresponds to the "second learning value" according to the present invention.

Meanwhile, in the first to third embodiments, which have been described above, as fuel injection valves that are applied to the present invention, the explanation has been made with respect to the example of the fuel injection valve 12 of the VCO type having the fuel receiving part as the sac 12d, and the example of the fuel injection valve of the MS nozzle type that similarly has the fuel receiving part as the sac. However, the fuel receiving part of the fuel injection valve in the present invention is not limited to the one (sac) that is formed with a definite intention to temporally receiving fuel for injection, provided that it is a part in which the fuel which is introduced downstream of the seat part at the time of the lift operation of the needle valve can be received. More specifically, the fuel receiving part in the present invention may, for example, be a room that is formed due to manufacturing reasons (processing reasons) without inherently intending a use as a fuel receiving part.

Moreover, in the above described first to third embodiments, the explanation has been made taking an example of the internal combustion engine 10 that is a diesel engine as one example of a compression ignition internal combustion engine. However, internal combustion engines that are applied to the present invention are not limited to the compression ignition internal combustion engine, and a spark ignition internal combustion such as a gasoline engine may be applied, provided that a fuel injection valve which is applied to the present invention is included.

DESCRIPTION OF SYMBOLS 10 internal combustion engine
12 fuel injection valve
12a nozzle body of fuel injection valve
12a1 seat part of nozzle body
12b needle valve of fuel injection valve
12b1 seat contact part of needle valve
12c internal fuel passage
12d sac
12e nozzle hole
12f wall surface of nozzle body
14 common rail
16 exhaust passage
18 turbo supercharger
20 oxidation catalyst
22 DPF
24 intake passage
26 air cleaner
28 intercooler
30 intake throttle valve
32 air flow meter
34 common rail pressure sensor
36 intake air pressure sensor
40 ECU (Electronic Control Unit)
42 crank angle sensor
44 in-cylinder pressure sensor
46 accelerator position sensor

The invention claimed is:

1. An internal combustion engine, comprising a fuel injection valve which is capable of directly injecting fuel into a cylinder,
wherein the fuel injection valve includes:
a needle valve that has a seat contact part at its distal end part; and
a nozzle body that has a seat part with which the seat contact part comes into contact, a fuel receiving part formed downstream of the seat part, and at least one nozzle hole formed downstream of the seat part,
wherein the internal combustion engine further comprises an engine control processor that:
executes learning control of fuel injection amount to learn the fuel injection amount, wherein the learning control includes an execution of learning-use injection of fuel; and
executes pre-learning injection of fuel prior to the execution of learning-use injection for the learning control, wherein the pre-learning injection is executed at a same cycle or at one cycle before a cycle at which the learning-use injection is executed, and
wherein the pre-learning injection is a filling-use injection that fills the fuel receiving part with fuel, and the amount of the pre-learning injection is less than or equal to the amount of the learning-use injection.

2. The internal combustion engine according to claim 1, wherein the learning control is a learning control of small injection to inject, as the learning-use injection, smaller amount of fuel than an amount of fuel that is required to an idling operation of the internal combustion engine during deceleration of the internal combustion engine, the small injection being executed based on a relation between an amount of the learning-use injection and a fluctuation of rotational speed of the internal combustion engine when the learning-use injection is executed.

3. The internal combustion engine according to claim 1, wherein the engine control processor:
calculates a first learning parameter as to an amount of fuel that is injected by the learning-use injection when the learning-use injection is executed without being accompanied by the filling-use injection;
calculates a second learning parameter as to an amount of fuel that is injected by the learning-use injection when the learning-use injection is executed with the filling-use injection; and
causes the learning-use injection to be executed without being accompanied by the filling-use injection when a difference between the second learning parameter and the first learning parameter is smaller than a predetermined value, the injection mode switching means being for causing the learning-use injection to be executed with the filling-use injection when the difference is equal to or higher than the predetermined value.

4. The internal combustion engine according to claim 3, wherein the engine control processor:
executes, using the fuel injection valve, two small injections that are executed with a command value of a same fuel injection amount at a timing in which injected fuel is capable of being ignited, in addition to main injection for generating a torque of the internal combustion engine;
uses, as the filling-use injection, a first small injection of the two small injections when a post injection as the small injection is not executed at a last cycle; and
uses, as the first learning parameter, a learning parameter as to an injection amount of fuel injected by the first small injection, and uses, as the second learning parameter, a learning parameter as to an injection amount of fuel injected by a second small injection.

5. The internal combustion engine according to claim 1, wherein the engine control processor:
executes, using the fuel injection valve, one or a plurality of small injections during one cycle in addition to main injection for generating a torque of the internal combustion engine;
calculates a first learning value for bringing an estimated value of injection amount of fuel injected by the learning-use injection in line with a command value of fuel injection amount for the learning-use injection when the learning-use injection is executed without being accompanied by the filling-use injection;
calculates a second learning value for bringing an estimated value of injection amount of fuel injected by the learning-use injection in line with a command value of fuel injection amount for the learning-use injection when the learning-use injection is executed with the filling-use injection; and
selects a learning value so that the first learning value is used with respect to the small injection that is executed first after elapse of a predetermined period in an expansion stroke at which a decrease rate of in-cylinder pressure is high, the learning value selection means being for selecting a learning value so that the second learning value is used with respect to the small injection that is executed second or later when the small injection is executed second or later after elapse of the predetermined period.

6. The internal combustion engine according to claim 1, wherein the filling-use injection is executed, prior to execution of the learning-use injection, during a period from a time when an in-cylinder pressure becomes stable in an expansion stroke at one cycle before a cycle in which execution of the learning-use injection is scheduled, to a time that is earlier, by a predetermined time, than an execution timing of the learning-use injection at the cycle in which execution of the learning-use injection is scheduled.

7. An internal combustion engine, comprising a fuel injection valve which is capable of directly injecting fuel into a cylinder, wherein the fuel injection valve includes:
   a needle valve that has a seat contact part at its distal end part;
   a nozzle body that has a seat part with which the seat contact part comes into contact, a fuel receiving part formed downstream of the seat part, and at least one nozzle hole formed downstream of the seat part,
   wherein the internal combustion engine further comprises an engine control processor that:
      executes learning control of fuel injection amount to learn the fuel injection amount, wherein the learning control includes an execution of learning-use injection of fuel;
      executes pre-learning injection of fuel prior to the execution of learning-use injection for the learning control,
      wherein the pre-learning injection is executed at a same cycle or at one cycle before a cycle at which the learning-use injection is executed, and
      if the pre-learning injection is executed at the same cycle, the pre-learning injection is injected in a compression stroke or an intake stroke,
      if the pre-learning injection is executed at one cycle before the cycle, the pre-learning injection is injected in a late stage of an expansion stroke or an exhaust stroke,
      and wherein the pre-learning injection is a filling-use injection that fills the fuel receiving part with fuel.

8. The internal combustion engine according to claim 7, wherein the learning control is a learning control of small injection to inject, as the learning-use injection, smaller amount of fuel than an amount of fuel that is required to an idling operation of the internal combustion engine during deceleration of the internal combustion engine, the small injection being executed based on a relation between an amount of the learning-use injection and a fluctuation of rotational speed of the internal combustion engine when the learning-use injection is executed.

9. The internal combustion engine according to claim 7, wherein the engine control processor:
   calculates a first learning parameter as to an amount of fuel that is injected by the learning-use injection when the learning-use injection is executed without being accompanied by the filling-use injection;
   calculates a second learning parameter as to an amount of fuel that is injected by the learning-use injection when the learning-use injection is executed with the filling-use injection; and
   causes the learning-use injection to be executed without being accompanied by the filling-use injection when a difference between the second learning parameter and the first learning parameter is smaller than a predetermined value, the injection mode switching means being for causing the learning-use injection to be executed with the filling-use injection when the difference is equal to or higher than the predetermined value.

10. The internal combustion engine according to claim 9, wherein the engine control processor:
   executes, using the fuel injection valve, two small injections that are executed with a command value of a same fuel injection amount at a timing in which injected fuel is capable of being ignited, in addition to main injection for generating a torque of the internal combustion engine;
   uses, as the filling-use injection, a first small injection of the two small injections when a post injection as the small injection is not executed at a last cycle; and
   uses, as the first learning parameter, a learning parameter as to an injection amount of fuel injected by the first small injection, and uses, as the second learning parameter, a learning parameter as to an injection amount of fuel injected by a second small injection.

11. The internal combustion engine according to claim 7, wherein the engine control processor:
   executes, using the fuel injection valve, one or a plurality of small injections during one cycle in addition to main injection for generating a torque of the internal combustion engine;
   calculates a first learning value for bringing an estimated value of injection amount of fuel injected by the learning-use injection in line with a command value of fuel injection amount for the learning-use injection when the learning-use injection is executed without being accompanied by the filling-use injection;
   calculates a second learning value for bringing an estimated value of injection amount of fuel injected by the learning-use injection in line with a command value of fuel injection amount for the learning-use injection when the learning-use injection is executed with the filling-use injection; and
   selects a learning value so that the first learning value is used with respect to the small injection that is executed first after elapse of a predetermined period in an expansion stroke at which a decrease rate of in-cylinder pressure is high, the learning value selection means being for selecting a learning value so that the second learning value is used with respect to the small injection that is executed second or later when the small injection is executed second or later after elapse of the predetermined period.

12. The internal combustion engine according to claim 7, wherein the filling-use injection is executed, prior to execution of the learning-use injection, during a period from a time when an in-cylinder pressure becomes stable in an expansion stroke at one cycle before a cycle in which execution of the learning-use injection is scheduled, to a time that is earlier, by a predetermined time, than an execution timing of the learning-use injection at the cycle in which execution of the learning-use injection is scheduled.

* * * * *